(12) United States Patent
Park et al.

(10) Patent No.: US 8,693,422 B2
(45) Date of Patent: Apr. 8, 2014

(54) METHOD AND APPARATUS FOR SUBBAND SCHEDULING IN WIRELESS COMMUNICATION SYSTEM

(75) Inventors: Young-Jun Park, Seoul (KR); Sang-Hoon Oh, Seoul (KR); Ki-Young Han, Yongin-si (KR); Hyon-Goo Kang, Suwon-si (KR); Byoung-Ha Yi, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 342 days.

(21) Appl. No.: 13/272,459

(22) Filed: Oct. 13, 2011

(65) Prior Publication Data

US 2012/0093105 A1    Apr. 19, 2012

(30) Foreign Application Priority Data

Oct. 15, 2010    (KR) .................. 10-2010-0101104

(51) Int. Cl.
*H04W 74/04*    (2009.01)
*H04W 72/04*    (2009.01)

(52) U.S. Cl.
USPC .......................................... 370/329; 370/331

(58) Field of Classification Search
USPC ......................................................... 370/329
See application file for complete search history.

(56) References Cited

U.S. PATENT DOCUMENTS

| | | | |
|---|---|---|---|
| 2010/0216473 A1* | 8/2010 | Kazmi et al. ................. | 455/436 |
| 2011/0014938 A1* | 1/2011 | Shekalim ...................... | 455/509 |
| 2012/0307808 A1* | 12/2012 | Song et al. .................... | 370/336 |
| 2013/0044694 A1* | 2/2013 | Aguirre et al. ............... | 370/329 |
| 2013/0065580 A1* | 3/2013 | Hassan et al. ............. | 455/422.1 |
| 2013/0130693 A1* | 5/2013 | Salvador et al. ............. | 455/437 |
| 2013/0203435 A1* | 8/2013 | Smith et al. .................. | 455/454 |

* cited by examiner

*Primary Examiner* — Brandon Renner
*Assistant Examiner* — Faisal Choudhury
(74) *Attorney, Agent, or Firm* — Jefferson IP Law, LLP

(57) ABSTRACT

A method of scheduling a subband is provided. The method includes determining whether the eNodeB is in an overload state according to a used amount of a first radio resource of the eNodeB, receiving information on a used amount of a second radio source of at least one neighbor eNodeB from the at least one neighbor eNodeB, determining whether the at least one neighbor eNodeB is in the overload state, setting a number of total subbands to be used for a subband scheduling to a number lower than a number of total subbands used by the at least one neighbor eNodeB, setting a subband scheduling start order such that the subband scheduling is started from a subband having a farthest distance in frequency from at least one subband used by the at least one neighbor eNodeB from among the set number of subbands, and performing the subband scheduling.

20 Claims, 9 Drawing Sheets

METHOD AND APPARATUS FOR SUBBAND SCHEDULING IN WIRELESS COMMUNICATION SYSTEM

PRIORITY

This application claims the benefit under 35 U.S.C. §119 (a) of a Korean patent application filed in the Korean Industrial Property Office on Oct. 15, 2010 and assigned Serial No. 10-2010-0101104, the entire disclosure of which is hereby incorporated by reference.

BACKGROUND OF THE INVENTION

1. Field of the Invention

The present invention relates to a method and an apparatus for a subband scheduling in a wireless communication system.

2. Description of the Related Art

When there is a shortage of allocable radio resources due to a load, a conventional evolved NodeB (eNodeB) (hereinafter, referred to as a "cell") limits access of an additional terminal and limits services of terminals which are currently accessing the cell in order to reduce an amount of traffic throughput of the cell so that a cell load may be reduced. A cell in an overload state can use a Call Admission Control (CAC) method and a Quality of Service (QoS) based control method to improve a cell throughput.

The CAC method is a method of determining whether a call of a terminal attempting access to a cell is accepted according a cell load. When the CAC method is used, a cell calculates a load amount additionally generated by a service required by the terminal when the terminal requests access. Furthermore, when the cell determines that the calculated load amount may be processed by the cell, the cell accepts a request for a call acceptance of the terminal. Accordingly, when the cell is in an overload state, the cell blocks a terminal attempting access by using the CAC method, which prevents a cell throughput from being reduced.

The QoS based control method is a method of blocking a terminal attempting access based on QoS. A cell distributes limited radio resources to terminals that are each requesting different services. The cell first allocates the limited radio resources to a terminal requesting a service requiring high QoS by performing QoS scheduling. Accordingly, when the cell is in an overload state, a terminal provided with a service requiring low QoS cannot be allocated the limited radio resources and thus the terminal cannot be continuously provided with service.

As described above, in the prior arts, in order to solve a problem such as a cell throughput decline, the cell in an overload state reduces the number of terminals, which are currently accessing the cell. As a result, a problem occurs in that a transmission data amount is reduced or QoS that is provided to a terminal is deteriorated.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for a subband scheduling in a wireless communication system.

Another aspect of the present invention is to provide a method and an apparatus for a subband scheduling for improving a throughput of a cell in an overload state in a wireless communication system.

Another aspect of the present invention is to provide a method and an apparatus for a subband scheduling in which a cell in an overload state exchanges radio resource use status information with a neighbor cell so that a service may be continuously provided to a terminal without deterioration in quality in a wireless communication system.

In accordance with an aspect of the present invention, a subband scheduling method of an eNodeB in a wireless communication system is provided. The subband scheduling method includes determining whether the eNodeB is in an overload state according to a used amount of a first radio resource of the eNodeB, if the eNodeB is not in the overload state, receiving information on a used amount of a second radio source of at least one neighbor eNodeB from the at least one neighbor eNodeB, determining whether the at least one neighbor eNodeB is in the overload state according to the used amount of the second radio resource, if the at least one neighbor eNodeB is in the overload state, setting a number of total subbands to be used for a subband scheduling to a number lower than a number of total subbands used by the at least one neighbor eNodeB, setting a subband scheduling start order such that the subband scheduling is started from a subband having a farthest distance in frequency from at least one subband used by the at least one neighbor eNodeB from among the set number of subbands, and performing the subband scheduling according to the set number of subbands and the subband scheduling start order.

In accordance with another aspect of the present invention, a subband scheduling apparatus of an eNodeB in a wireless communication system is provided. The subband scheduling apparatus includes a call processor for receiving information on a used amount of a second radio resource of at least one neighbor eNodeB from the at least one neighbor eNodeB, a scheduler for storing information on a used amount of a first radio resource of the eNodeB and the used amount of the second radio resource, and for performing a subband scheduling, a controller for determining whether the eNodeB is in an overload state according to the used amount of the first radio resource, for receiving, if the eNodeB is not in the overload state, the information on the used amount of the second radio resource from the at least one neighbor eNodeB by controlling the call processor, for determining whether the at least one neighbor eNodeB is in the overload state based on the used amount of the second radio resource, for setting, if the at least one neighbor eNodeB is in the overload state, a number of total subbands to be used for the subband scheduling to a number lower than a number of total subbands used by the at least one neighbor eNodeB, for setting a subband scheduling start order such that the subband scheduling is started from a subband having a farthest distance in frequency from at least one subband used by the at least one neighbor eNodeB from among the set number of subbands, and for controlling the scheduler to perform the subband scheduling according to the set number of subbands and the subband scheduling start order.

Aspects of the present invention have an effect of improving a throughput and a performance of a cell in an overload state. Furthermore, aspects of the present invention have an advantage in that a cell in an overload state exchanges radio resource use status information with a neighbor cell so that a service may be continuously provided to a terminal without deterioration in quality.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiment of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention propose a method and an apparatus for a subband scheduling in a wireless communication system. Specifically, the present invention proposes a method and an apparatus for a subband scheduling in which a cell in an overload state exchanges radio resource use status information with a neighbor cell so that a service may be continuously provided to a terminal without deterioration in quality of service. Hereinafter, although the exemplary wireless communication system that is described is a Long Term Evolution (LTE) communication system for convenience of the description, the present invention is not limited thereto, and it is apparent that the present invention can be applied to other communication systems as well as the LTE communication system.

Hereinafter, a method and an apparatus for a subband allocation according to embodiments of the present invention will be described in detail.

Figure 1:
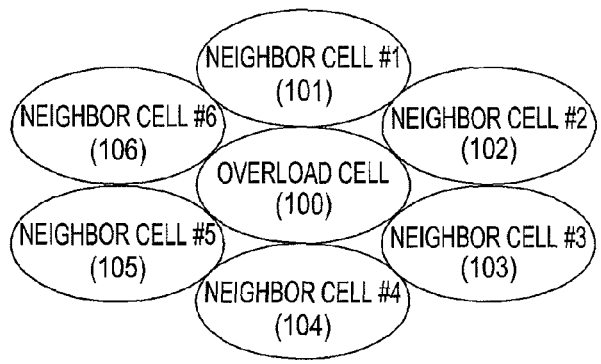
FIG. 1 illustrates a distribution of a cell in a wireless communication system according to an exemplary embodiment of the present invention.

FIG. 1 is a diagram illustrating a distribution of a cell in a wireless communication system according to an exemplary embodiment of the present invention.

Referring to FIG. 1, the diagram illustrates a cell in an overload state (hereinafter, referred to as an "overload cell") 100 and neighbor cells 101 to 106 that are neighboring to the overload cell 100. The overload cell 100 can improve a cell throughput through a transmission/reception of radio resource use status information with the neighbor cells 101 to 106.

Hereinafter, a method for improving performance of the overload cell is described with reference to FIG. 2.

Figure 2:
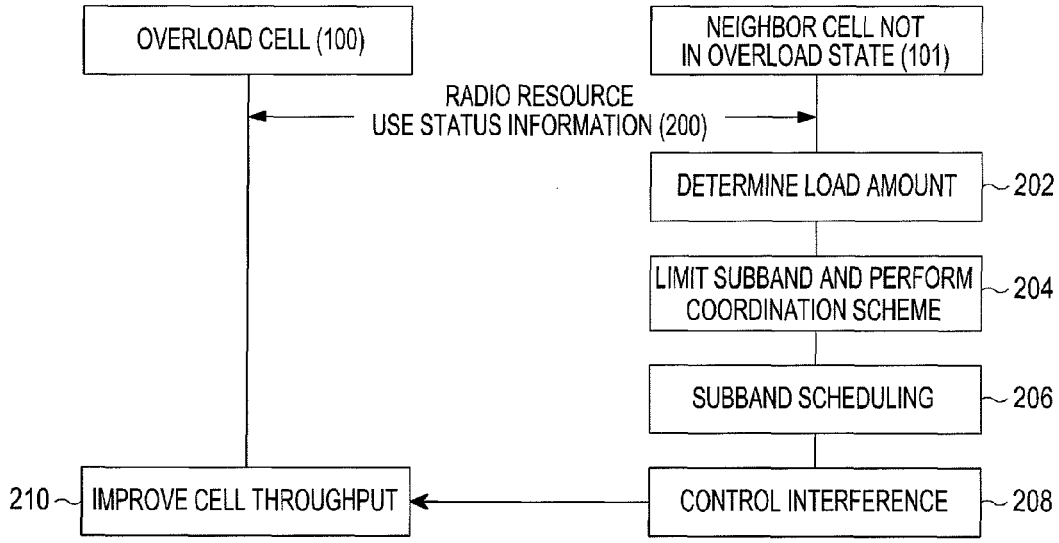
FIG. 2 is a flowchart between an overload cell and a neighbor cell in a wireless communication system according to an exemplary embodiment of the present invention.

FIG. 2 is a flowchart between an overload cell and a neighbor cell in a wireless communication system according to an exemplary embodiment of the present invention.

Referring to FIG. 2, a method for improving a cell throughput using communication between the overload cell 100 and the neighbor cell 101 is described as an example. The overload cell 100 transmits radio resource use status information to the neighbor cell 101 through an X2 interface, a backhaul interface, and an S1 interface in step 200. Radio resource use status information is included in a radio resource use status message having a format of Table 1 below.

TABLE 1

| Information Element (IE)/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement IDentifier (ID) | M | | INTEGER (1..4095,...) | | YES | reject |
| eNB2 Measurement ID | M | | INTEGER (1..4095,...) | | YES | reject |
| Cell Measurement Result Item | | 1 | | | YES | ignore |
| >Cell Measurement Result Item | | 1 to maxCellineNB | | | EACH | ignore |

TABLE 1-continued

| Information Element (IE)/Group Name | Presence | Range | IE type and reference | Semantics description | Criticality | Assigned Criticality |
|---|---|---|---|---|---|---|
| >>Cell ID | M | | ECGI 9.2.14 | | | |
| >>Hardware Load Indicator | O | | 9.2.34 | | | |
| >>S1 Transport Link Layer (TLL) Load Indicator | O | | 9.2.35 | | | |
| >>Radio Resource Status | O | | 9.2.37 | | | |
| >>Composite Available Capacity Group | O | | 9.2.44 | | YES | ignore |

As shown in Table 1 above, the radio resource use status message contains a message type, an Information Element (IE), a transmission cell ID (Identifier) (eNB 1 Measurement ID) IE, a reception cell ID (eNB 2 Measurement ID) IE, and a cell measurement result item IE.

Furthermore, the cell measurement result item IE includes a hardware load indicator IE, an S1 Transport Layer Link (TLL) load indicator IE, a radio resource status IE, and a composite available capacity group IE.

The radio source status IE indicates radio resource use status information and includes Physical Resource Block (PRB) use information. Further, the radio resource status IE has a format as shown in Table 2 below.

TABLE 2

| IE/Group Name | Presence | Range | IE type and reference | Semantics description |
|---|---|---|---|---|
| DownLink (DL) Guaranteed Bit Rate (GBR) PRB usage | M | | INTEGER (0 . . . 100) | |
| UpLink (UL) GBR PRB usage | M | | INTEGER (0 . . . 100) | |
| DL non-GBR PRB usage | M | | INTEGER (0 . . . 100) | |
| UL non-GBR PRB usage | M | | INTEGER (0 . . . 100) | |
| DL Total PRB usage | M | | INTEGER (0 . . . 100) | |
| UL Total PRB usage | M | | INTEGER (0 . . . 100) | |

As shown in Table 2, the radio resource status IE includes a PRB use IE about a DownLink (DL) signal requiring a guarantee of Quality of Service (QoS) (DL GBR PRB usage IE), a PRB use IE about an UpLink (UL) signal requiring a guarantee of QoS (UL GBR PRB usage IE), a PRB use IE about a DL signal not requiring a guarantee of QoS (DL non-GBR PRB usage IE), a PRB use IE about a UL signal not requiring a guarantee of QoS (UL non-GBR PRB usage IE), a PRB use IE about total DL signals (DL Total PRB usage IE), and a PRB use IE about total UL signals (UL Total PRB usage IE).

Referring again to FIG. 2, when the radio resource use status message, constructed according to Table 1 and Table 2, is received from the overload cell 100, the neighbor cell 101 determines a load amount of the overload cell 100 based on the radio resource use status information included in the radio resource use status message in step 202. The neighbor cell 101 determines whether each cell is in an overload state according to the load amount of the overload cell 100 and its own load amount, and then performs an operation of step 204 described below in order to minimize an effect of interference with the overload cell 100.

The neighbor cell 101 determines the number of total subbands to be used for the subband scheduling and a start subband for starting the scheduling by using a subband restriction scheme and a subband coordination scheme in step 204. The subband restriction scheme refers to a scheme of limiting the number of total subbands to be used for the subband scheduling to a number less than a certain number. The certain number may be set to a number less than the number of total subbands used by the neighbor cell.

When the number of total subbands to be used for the scheduling is determined by using the subband coordination scheme, the subband coordination scheme determines a start subband from among the determined number of subbands and allocates the determined number of subbands from the start subband. The start subband refers to another cell, that is, a subband, which is minimally overlapped with the subband allocated in the overload cell 100.

As described above, when the number of total subbands and the start subband is determined, the neighbor cell 101 performs the subband scheduling by using the number of total subbands and the start subband in step 206. Then, the neighbor cell 101 reduces or controls the interference to the overload cell 100 in step 208, and accordingly the overload cell 100 can improve the cell throughput in step 210.

Next, a block construction of a cell in a wireless communication system according to embodiments of the present invention is described with reference to FIG. 3.

Figure 3:
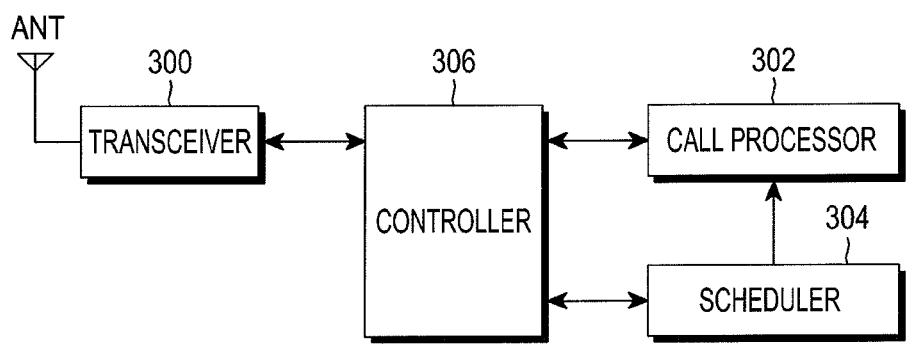
FIG. 3 is a block diagram of a cell in a wireless communication system according to an exemplary embodiment of the present invention.

FIG. 3 is a block diagram of a cell in a wireless communication system according to an exemplary embodiment of the present invention.

Referring to FIG. 3, the neighbor cell or the overload cell (both of which may be referred to as "the cell" with respect to FIG. 3) include a transceiver 300, a call processor 302, a scheduler 304, and a controller 306.

The transceiver 300 performs a wireless communication function with a terminal. The call processor 302 provides an interface for performing inter-cell communication, and transmits and/or receives a radio resource use status information message including radio resource use status information (hereinafter, referred to as "RU_N(i)") to/from the neighbor cell. The radio resource use status information may include information on a used amount of a radio resource for each service.

Specifically, the call processor 302 requests at least one neighbor cell from among neighbor cells included in a neighbor cell list to report the RU_N(i), and the call processor 302 receives the reported RU_N(i) from the at least one neighbor cell. Furthermore, when the call processor 302 is requested to report the RU_N(i) from the at least one neighbor cell, the call processor 302 transmits the RU_N(i) to the at least one neighbor cell.

The scheduler 304 stores the neighbor cell list, an average used amount of the radio resource (hereinafter, referred to as "RU_S") allocated to all terminals in the cell during a preset time period T_LOAD, the RU_N(i) of the cell, and the RU_N (i) of the neighbor cell included in the received radio resource use status message. Furthermore, when the call processor 302 is requested to report the RU_N(i) by the at least one neighbor cell, the scheduler 304 transmits the RU_N(i) of the cell to the call processor 302.

The scheduler 304 stores information on the number of total subbands to be used for the subband scheduling and the start subband in order to start the subband scheduling determined by the controller 306. In addition, the scheduler 304 performs the subband scheduling according to the information on the number of total subbands and the start subband.

The controller 306 controls the transceiver 300, the call processor 302, the scheduler 304, and overall operations of the cell. The controller 306 may be an OAM (Operation Administration Maintenance) unit as an example. However, the present invention is not limited thereto, and the controller 306 may be any suitable microprocessor or combination of microprocessors.

Particularly, when the neighbor cell is an overload cell, the controller 306 controls the interference to the overload cell so that the performance of the overload cell is not be deteriorated. An operation of the controller 306 for the purpose of controlling the interface to the overload cell is described in detail with reference to FIG. 4.

Figure 4:
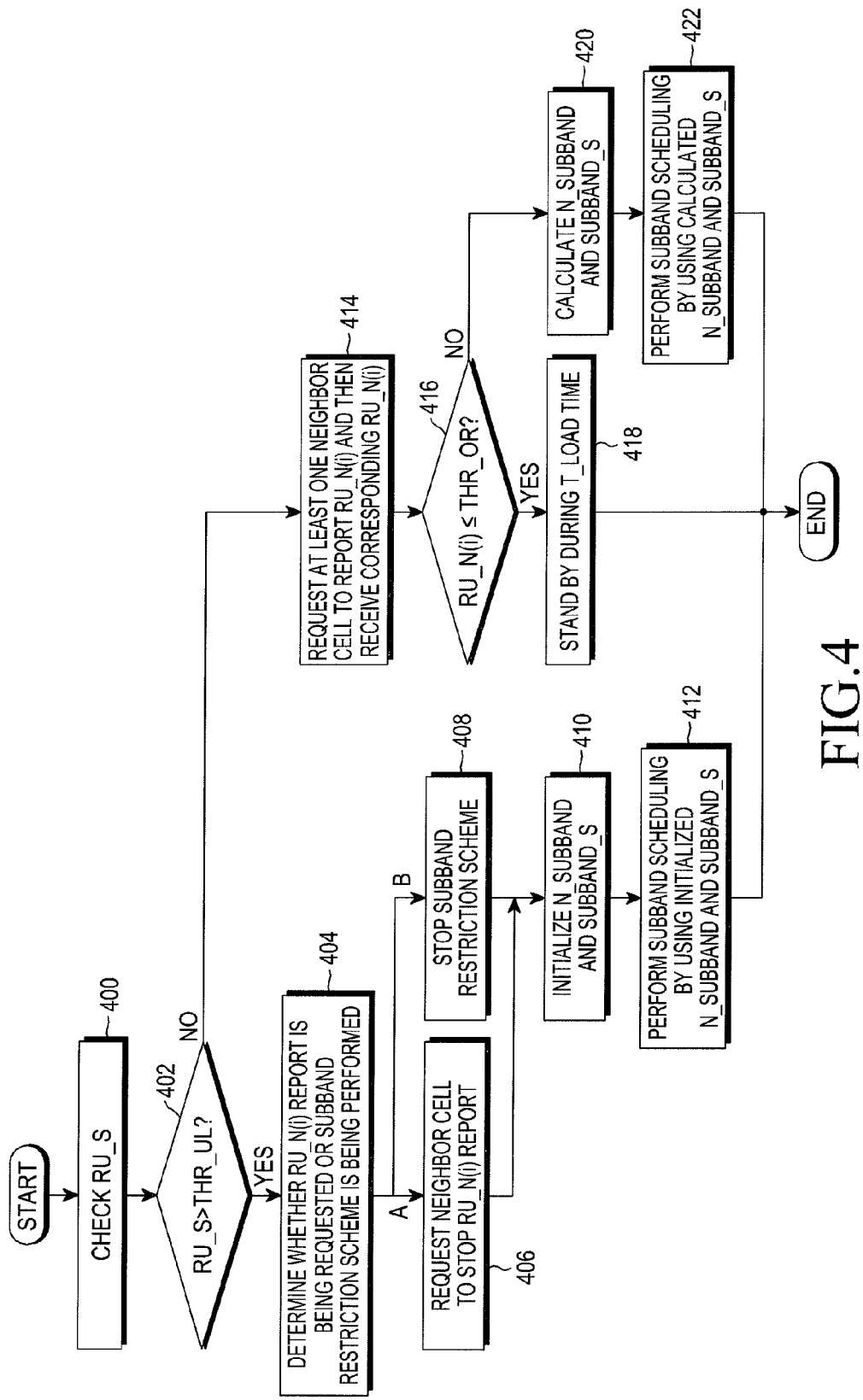
FIG. 4 is a flowchart illustrating a subband scheduling process in a wireless communication system according to an exemplary embodiment of the present invention.

FIG. 4 is a flowchart illustrating a subband scheduling process in a wireless communication system according to an exemplary embodiment of the present invention.

Referring to FIG. 4, the controller 306 periodically checks the RU_S in every preset time period T_LOAD in step 400. Next, the controller 306 determines whether the checked RU_S is greater than an upload threshold THR_UL in step 402.

When the checked RU_S is greater than the THR_UL, the controller 306 determines that its own cell is in an overload state and proceeds to step 404. The controller 306 determines whether a RU_N(i) report is being requested from at least one neighbor cell or a subband restriction scheme is being used to limit the allocation number of subbands in step 404. If the RU_N(i) report is being requested from the at least one neighbor cell, then the subband scheduling process proceeds along path A. If the subband restriction scheme is being used to limit the allocation number of subbands, then the subband scheduling process proceeds along path B.

When the RU_N(i) report is being requested from the at least one neighbor cell, the controller 306 proceeds to step 406 and requests the at least one neighbor cell to stop the RU_N(i) report. Alternatively, when the subband restriction scheme is being implemented, the controller 306 proceeds to step 408 and stops the subband restriction scheme.

Subsequently, the controller 306 initializes the number of total subbands (hereinafter, referred to as "N_SUBBAND") to be used for the subband scheduling and information (hereinafter, referred to as "SUBBAND_S") on the start subband in order to start the subband scheduling in step 410. For example, the controller 306 may set the N_SUBBAND to a value of "9" which is the number of allocable total subbands, and may set the SUBBAND_S to subband 1 which is a predetermined subband (e.g. a subband corresponding to the lowest or highest frequency) among the total subbands. Next, the controller 306 performs the subband scheduling according to the initialized N_SUBBAND and SUBBAND_S in step 412.

As described above, the controller 306 periodically determines whether its own cell is in an overload state based on the RU_S. When the cell is in an overload state, the controller 306 allows a maximum number of subbands to be allocated, which minimizes the load amount.

Meanwhile, when it is determined that the checked RU_S is not greater than the THR_UL in step 402, the controller 306 determines that its own cell is not in an overload state and proceeds to step 414. After the controller 306 requests at least one neighbor cell to report the RU_N(i), the controller 306 receives the RU_N(i) from the at least one neighbor cell in step 414. Next, in step 416, the controller 306 determines whether the received RU_N(i) is less than or equal to a threshold THR_OR in order to determine whether the corresponding neighbor cell is in an overload state.

When the received RU_N(i) is less than or equal to the THR_OR, the controller 306 determines that the corresponding cell is not in an overload state and stands by during a time period T_LOAD in step 418. That is, the controller 306 stands by until a subsequent time period T_LOAD starts.

Furthermore, when the received RU_N(i) is greater than the THR_OR, the controller 306 determines that the corresponding neighbor cell is in an overload state and determines the N_SUBBAND and the SUBBAND_S in step 420. The controller 306 determines the N_SUBBAND by executing the subband restriction scheme, and determines the SUBBAND_S by executing the subband coordination scheme. At this time, the controller 306 determines the N_SUBBAND by using the following Equation (1) in executing the subband restriction scheme.

$$N\_SUBBAND = (N\_D\_RESOURCE + N\_S\_RESOURCE)/N\_RESOURCE\_SUBBAND \quad \text{Equation (1)}$$

In equation (1), N_D_RESOURCE denotes the product of the RU_S and an amount of available radio resources in total subbands, N_S_RESOURCE denotes an amount of radio resources required for transmitting periodical information or data, and N_RESOURCE_SUBBAND denotes an amount of available radio resources for each subband. When the N_SUBBAND is determined as described above, the controller 306 determines the SUBBAND_S by executing the subband coordination scheme. A method of determining the SUBBAND_S according to the subband coordination scheme will be described later in detail.

When the N_SUBBAND and the SUBBAND_S are determined, the controller 306 performs the subband scheduling according to the calculated N_SUBBAND and SUBBAND_S in step 422.

As described above, when it is determined that the neighbor cell is in an overload state, the controller 306 limits the number of subbands to be allocated in its own cell and allocates a subband used by the neighbor cell, wherein the allocated subband is minimally overlapped with subbands of the overload cell so that interference may be minimized.

Hereinafter, the subband coordination scheme according to embodiments of the present invention will be described.

The subband coordination scheme refers to a scheme of allocating subbands such that interference with a neighbor cell is minimized based on limited information and in a state where the manner in which subbands of the neighbor cell are allocated is not known. The limited information may contain a neighbor cell list, Physical Cell Identifiers (PCIs) of neighbor cells, and information on a load amount of the neighbor cell, or other suitable forms or types of information.

The neighbor cell list and the PCI of the neighbor cell are values determined in designing a cell and have fixed values. The information on the load amount of the neighbor cell is a value changeable according to an amount of communication between the neighbor cell and a terminal, and may correspond to the RU_N(i) included in the radio resource use status message described above.

Meanwhile, in order to increase the throughput by minimizing interference with the neighbor cell, the corresponding cell should allocate a subband such that its own subband is not maximally overlapped with a subband allocated to the neighbor cell. Hereinafter, for the above method, a case where a wireless communication system is a Long Term Evolution (LTE) communication system using a bandwidth of 10 MHz will be described as an example and the following conditions (A) through (D) are assumed. However, the present invention is not limited to operating under the conditions (A) through (D) and the present invention may operate under other suitable conditions.

(A) The PCI of each cell is allocated such that a value of PCI mod 3 is an integer.

(B) An effect of interference between cells having different values of PCI mod 3 is greater than an effect of interference between cells having the same values of PCI mod 3.

(C) The cell throughput is further increased when subbands allocated to neighbor cells are less overlapped.

(D) The number of available subbands is a total of "9" with regard to a bandwidth of 10 MHz.

Each of the 9 subbands consists of 6 PRBs and can process a maximum of 12% of the load amount. However, since a total of 50 PRBs may be used with regard to a bandwidth of 10 MHz, a 9th subband consists of 2 PRBs and can process a maximum of 12% of the load amount. Meanwhile, the subband allocation is determined by a value of PCI mod 3 and a subband allocation region of each cell is determined so as to not to be overlapped maximally according to the value of PCI mod 3.

Hereinafter, an example of the subband allocation region according to embodiments of the present invention is described with reference to FIG. 5.

Figure 5:
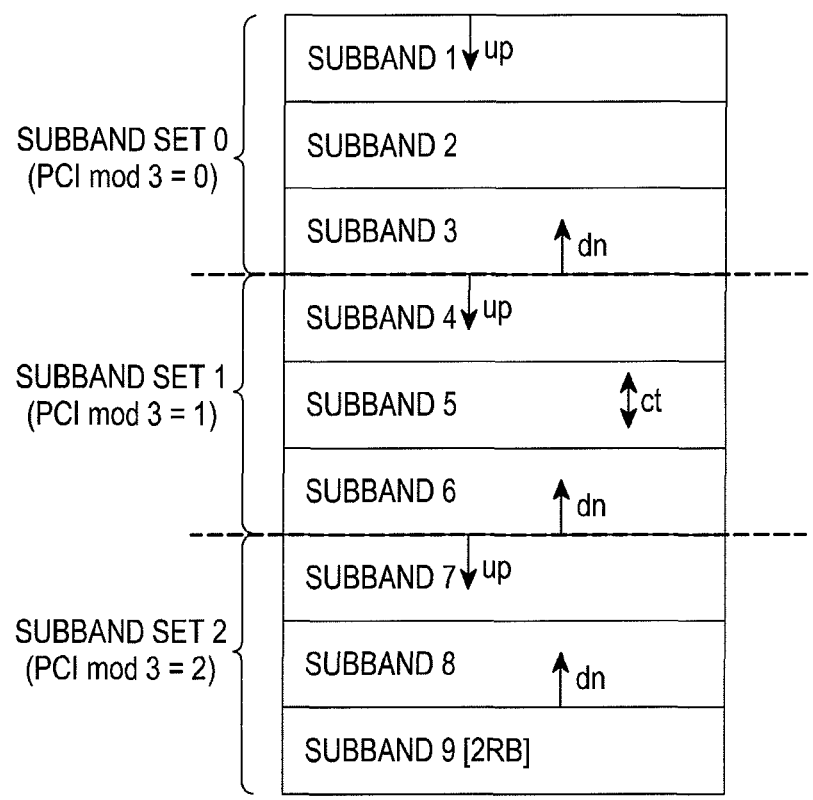
FIG. 5 illustrates a subband allocation region used in a wireless communication system according to an exemplary embodiment of the present invention.

FIG. 5 illustrates a subband allocation region used in a wireless communication system according to an exemplary embodiment of the present invention.

Referring to FIG. 5, a total of 9 subbands are divided into 3 subband sets according to a value of PCI mod 3. Referring to FIG. 5, cells having a PIC mod 3 value of "0" (PCI mod 3=0) allocate subbands 1 to 3, which is referred to as subband set 0, cells having a PIC mod 3 value of "1" (PCI mod 3=1) allocate subbands 4 to 6, which is referred to as subband set 1, and cells having a PIC mod 3 value "2" (PIC mod 3=2) allocate subbands 7 to 9, which is referred to as subband set 2.

A method of allocating the subband having the lowest frequency in each subband set is referred to as an "up" allocation method, a method of allocating the subband having the highest frequency in each subband set is referred to as a "dn" allocation method, and a method of equally allocating both subbands having a high frequency and a low frequency compared to the subband having an intermediate frequency is referred to as a "ct" allocation method. Meanwhile, when the value of PCI mod 3 is "2", subband 9 has only 2 PRBs so that the allocation is started from subband 8 when the "dn" allocation method is used.

Furthermore, the allocation method to be used in the subband allocation is determined among the "up", "dn", and "ct" allocation methods according to a load amount of a corresponding cell, a value of PCI mod 3 of a neighbor cell, and a load amount of the neighbor cell.

Hereinafter, a subband allocation process is described with reference to FIG. 6.

Figure 6:
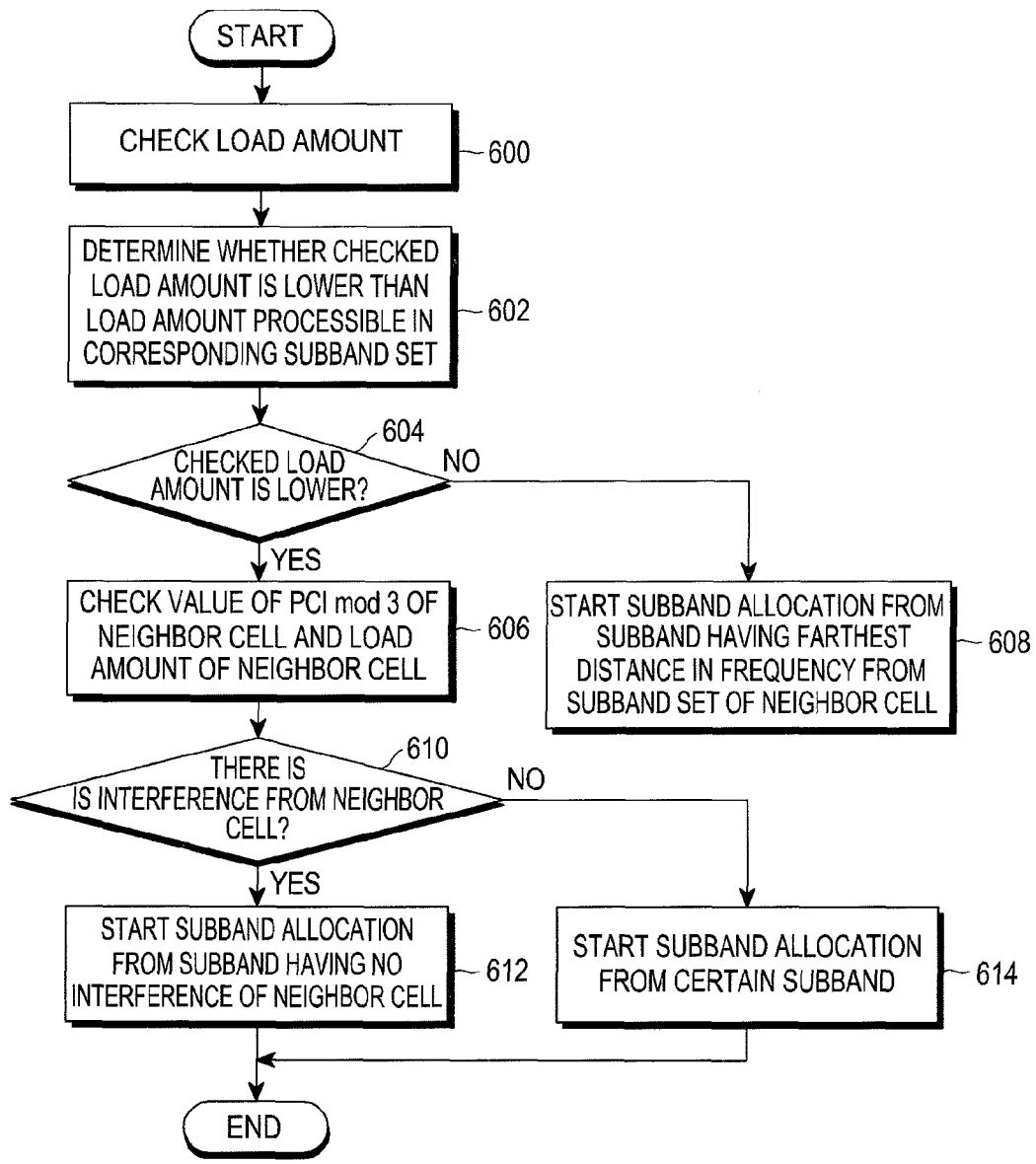
FIG. 6 is a flowchart illustrating a subband allocation process in a wireless communication system according to an exemplary embodiment of the present invention.

FIG. 6 is a flowchart illustrating the subband allocation process in a wireless communication system according to an exemplary embodiment of the present invention.

Referring to FIG. 6, a cell checks a load amount of its own cell in step 600. Next, in step 602, the cell determines whether the checked load amount is lower than a load amount processable in a corresponding subband set.

When it is determined that the checked load amount is lower than the load amount processable in the corresponding subband set in step 604, the cell proceeds to step 606 and checks a value of PCI mod 2 of a neighbor cell and a load amount of the neighbor cell. Furthermore, the cell determines whether there is interference from the neighbor cell based on the value of PCI mod 2 of the neighbor cell and the load amount of the neighbor cell in step 610.

That is, the cell determines whether a subband allocated by the neighbor cell overlaps with a subband included in a subband set of the cell so that the cell can determine whether there is interference from the neighbor cell. When there is interference from the neighbor cell, the cell starts the subband allocation from a subband having no interference of the neighbor cell by using one of the "up" and "dn" allocation methods in step 612. Alternatively, when there is no interference from the neighbor cell, the cell proceeds to step 614 and starts the subband allocation from a certain subband. At this time, the cell can use the "up" allocation method or the "dn" allocation method, or allocate the subband by using a method of alternately executing the "up" allocation method and the "dn" allocation method in order to minimize interference between cells having values of the same PCI mod 3.

Meanwhile, when it is determined that the checked load amount is not less than the load amount processable in the corresponding subband set in step 604, the cell starts the subband allocation from a subband having the farthest distance in frequency from the subband set of the neighbor cell by using one of the "up" allocation method and the "dn" allocation method in step 608. Here, when the corresponding subband set is subband set 1 (see FIG. 5), the subband allocation may be performed by using the "ct" allocation method. That is, subband 4 and subband 6 having a high frequency and a low frequency with regard to subband 5 having an intermediate frequency may be equally allocated in subband set 1.

Next, in order to provide further description of the process of FIG. 6, a method of allocating the subband according to a value of PCI mod 3 is described with reference to a detailed example.

As described above with reference to FIG. 5, since the subband sets are divided according to the value of PCI mod 3, subband allocation methods vary according to the value of PCI mod 3. Hereinafter, subband allocation methods for respective cells having the values of PCI mod 3 are "0", "1", and "2" are described in detail.

Figure 7:
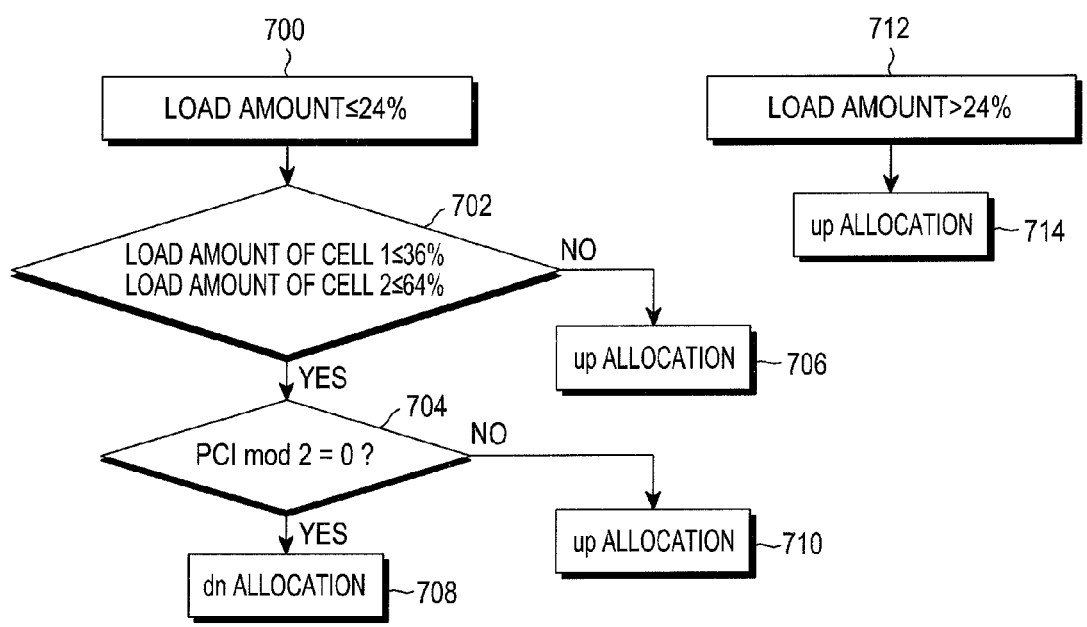
FIG. 7 is a flowchart illustrating a subband allocation process of a cell having a PCI mod 3 value of "0" in a wireless communication system according to an exemplary embodiment of the present invention.

FIG. 7 is a flowchart illustrating a subband allocation process of a cell having a PCI mod 3 value of "0" in a wireless communication system according to an exemplary embodiment of the present invention.

Referring to FIG. 7, the cell having the PCI mod 3 value of "0" (hereinafter, referred to as "cell 0") checks its own load amount and determines whether the checked load amount is less than or equal to 24%.

First, when it is determined that the checked load amount is less than or equal to 24% in step 700, cell 0 proceeds to step 702 and checks a load amount of a neighbor cell. In the exemplary embodiment of FIG. 7, one subband can process a maximum of 12% of the load amount so that two or fewer subbands may be allocated when the load amount of the cell having the PCI mod 3 value of "0" is less than or equal to 24% as described above. Furthermore, the subband allocation method may be determined based on the load amount of the neighbor cell.

When the neighbor cells of cell 0 are cells having a PCI mod 3 value of "1" (hereinafter, referred to as "cell 1") and a cell having a PCI mod 3 value of "2" (hereinafter, referred to as "cell 2"), then, in step 702, cell 0 determines whether a load amount of cell 1 is less than or equal to 36% and determines whether a load amount of cell 2 is less than or equal to 64%.

When the load amount of cell 1 is not less than or equal to 36% or the load amount of cell 2 is not less than or equal to 64%, cell 0 proceeds to step 706. In step 706, cell 0 performs the subband allocation from subband 1 by using the "up" allocation method. A detailed description of step 706 is as follows.

When the load amount of cell 1 is not less than or equal to 36%, subbands included in subband set 0, that is, at least one of subbands 1 to 3 (see FIG. 5), may be allocated by cell 1. Accordingly, when cell 1 allocates at least one of subbands 1 to 3 and cell 0 allocates the same subband as the subband allocated by cell 1, signals of cell 0 and cell 1 in the same subband may interfere with each other.

Therefore, in order to avoid the interference, cell 0 allocates the subband by using the "up" allocation method in step 706. In this case, subband 1 having the lowest frequency is first allocated, and an effect of interference between cell 0 and cell 1 may be minimized since subband 1 has the farthest distance in frequency from subbands 4 to 6 included in subband set 1

Meanwhile, when the load amount of cell 2 is greater than 64% (12%×5 (the number of subbands 4 to 8)+4%×1 (the number of subband 9)), subbands included in subband set 0 and subband set 1 may be allocated by cell 2. Accordingly, when cell 2 allocates at least one of the subbands included in subband set 0 and subband set 1 and cell 2 allocates the same subbands as that allocated by cell 0 and cell 1, signals between cell 0 and cell 2 may interfere with each other. Therefore, in order to minimize the effect of the interference, cell 0 performs the subband allocation from subband 1 by using the "up" allocation method in step 706.

When the load amount of cell 1 is less than or equal to 36% or the load amount of cell 2 is less than or equal to 64%, cell 0 determines that there is no interference between cell 1 and cell 2 and there is no interference with another cell having a PCI mod 3 value of "0". Here, when there is no interference between cell 1 and cell 2 (that is, when cell 1 and cell 2 do not allocate subbands included in subband set 0), cell 0 can arbitrarily use one of the "up" allocation method and the "dn" allocation method.

In FIG. 7, a case where cell 0 uses one of the "up" allocation method and the "dn" allocation method, according to a value of PCI mod 2, is described as an embodiment of the present invention. However, the present invention is not limited thereto and a method of arbitrarily setting the subband allocation methods may be variously changed.

In step 704, cell 0 determines whether its own PCI has a PCI mod 2 value of "0". When the value of PCI mod 2 is "0", cell 0 performs the subband allocation from subband 3 by using the "dn" allocation method in step 708. Otherwise, cell 0 performs the subband allocation from subband 1 by using the "up" allocation method in step 710.

Meanwhile, when it is determined that the checked load amount is greater than 24% in step 712, cell 0 performs the subband allocation from subband 1 by using the "up" allocation method in step 714.

When the checked load amount is greater than 36%, subbands included in subband set 1 should be additionally allocated. When cell 1 exists as a neighbor cell, interference may occur. Accordingly, cell 0 performs the subband allocation from subband 1 having the farthest distance in frequency from subbands 4 to 6 included in subband set 1.

Figure 8A:
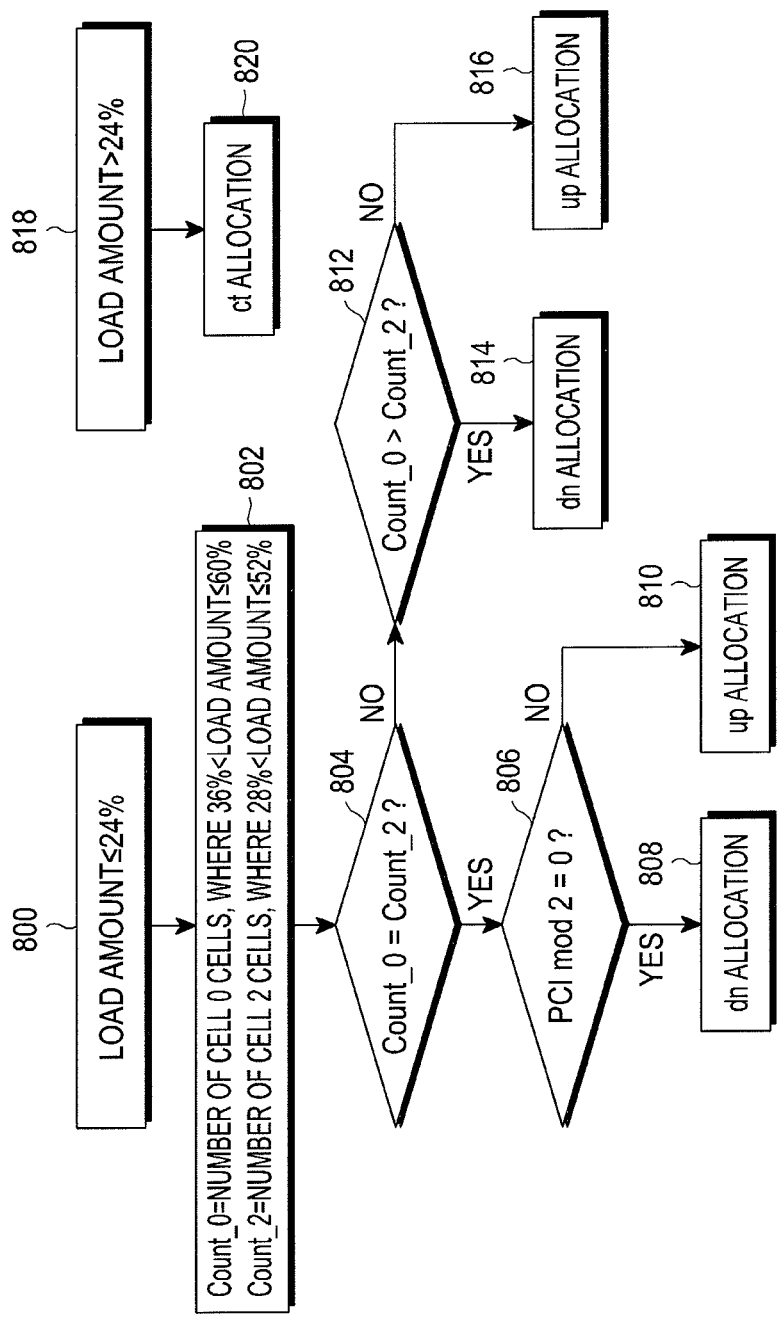
FIGS. 8A and 8B are flowcharts illustrating a subband allocation process of a cell having a PCI mod 3 value of "1" in a wireless communication system according to an exemplary embodiment of the present invention.
Figure 8B:
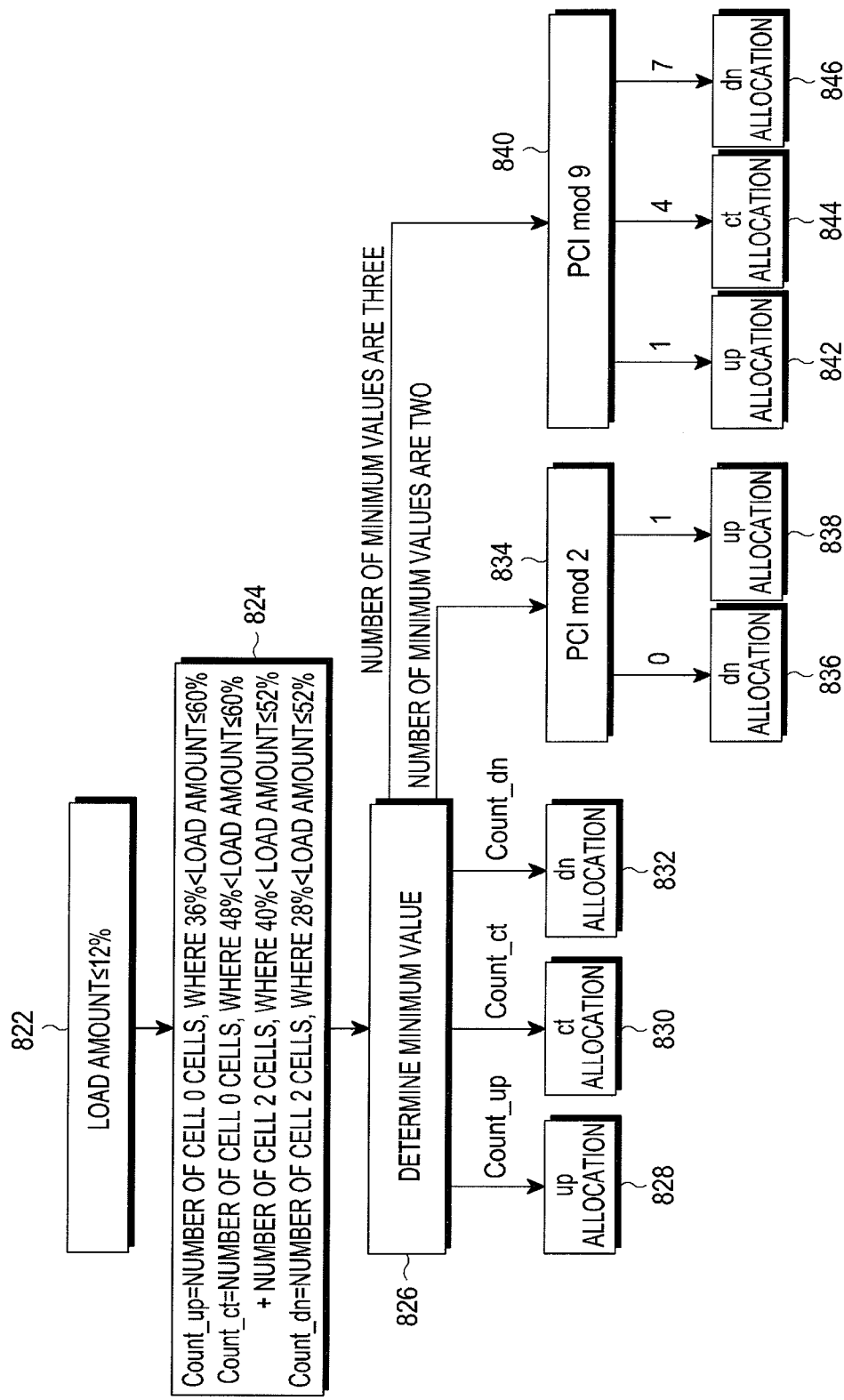

FIGS. 8A and 8B are flowcharts illustrating a subband allocation process of the cell having the PCI mod 3 value of "1" in a wireless communication system according to an exemplary embodiment of the present invention.

Referring to FIG. 8A, cell 1 checks its own load amount and performs the following processes according to whether the checked load amount is greater than 24%, or greater than 12% and less than or equal to 24%.

When it is determined that the checked load amount is greater than 24% in step 818, cell 1 performs the subband allocation by using the "ct" allocation method in step 820 since three or more subbands should be allocated. Specifically, starting at subband 5 positioned in the center of subbands 4 to 6 included in subband set 1, cell 1 equally allocates subbands having a high frequency and a low frequency with respect to subband 5.

However, when the number of subbands requiring the allocation is an even number, it is impossible to equally allocate the subbands. Accordingly, among neighbor cells, the number of cells having a PCI mod 3 value of "0" (i.e. the number of cell 0 cells) and the number of cells having a PCI mod 3 value of "2" (i.e. the number of cell 2 cells) are counted and one more subband of a subband set corresponding to a cell having the smaller number of subbands is additionally allocated.

Meanwhile, when it is determined that the checked load amount is greater than 12% and less than or equal to 24% in step 800, cell 1 determines that an allocation of 2 subbands is required. Furthermore, cell 1 selects one of the "up" subband allocation scheme and the "dn" subband allocation scheme as the subband allocation scheme based on the number of neighbor cells and a load amount of the neighbor cell.

That is, cell 1 counts the number of cell 0 cells (Count_0) of which a load amount is greater than 36% and less than or equal to 60% and the number of cell 2 cells (Count_2) of which a load amount is greater than 28% and less than or equal to 52% in step 802. Next, cell 2 determines whether the Count_0 and the Count_2 are the same in step 804.

The existence of cell 0, of which the load amount is greater than 36% and less than or equal to 60%, indicates that there is a cell 0 allocating one or two subbands included in subband set 1 as well as subband set 0. Furthermore, the existence of cell 2, of which load amount is greater than 28% and less than or equal to 52% indicates that there is a cell 2 allocating one or two subbands included in subband set 1 as well as subband set 2. Additionally, comparison of the Count_0 and the Count_2 by cell 1 is for determining one from among cell 0 and cell 2, which are neighbor cells, as a cell causing greater interference.

When the Count_0 and the Count_2 are the same, it is possible for cell 1 to arbitrarily use one of the "up" allocation method and the "dn" allocation method, because the interference from cell 0 and cell 2 is equally generated. As a result, an effect of the interference is not changed although either of the "up" allocation method or the "dn" allocation method is used.

Referring to FIG. 8A, a case where cell 1 uses one of the "up" allocation method and the "dn" allocation method according to a value of PCI mod 2 is described as an embodiment of the present invention. However, the present invention is not limited thereto, and a method of arbitrarily setting the subband allocation methods may be variously changed.

In step 806, cell 1 determines whether its own PCI has a PCI mod 2 value of "0". When the value of PCI mod 2 is "0", cell 1 performs the subband allocation from subband 6 by using the "dn" allocation method in step 808. Otherwise, cell 1 performs the subband allocation from subband 4 by using the "up" allocation method in step 810.

Meanwhile, when it is determined that the Count_0 and the Count_2 are not the same in step 804, cell 1 proceeds to step 812 and determines whether the Count_0 is greater than the Count_2. When the Count_0 is greater than the Count_2, cell 1 determines that cell 0 causes greater interference in comparison with cell 2. Accordingly, cell 1 allocates the subband by using the "dn" allocation method in step 814. When cell 1 allocates the subband by using the "dn" allocation method, subband 6 having the farthest distance in frequency from subbands 1 to 3 included in subband set 0 is first allocated. Therefore, cell 1 can minimize an effect of the interference from cell 0.

When it is determined that the Count_0 is not greater than the Count_2, that is, the Count_2 is greater than the Count_0 in step 812, cell 1 proceeds to step 816 and allocates the subband by using the "up" allocation method. When cell 1 allocates the subband by using the "up" allocation method, subband 4 having the farthest distance in frequency from subbands 7 to 9 included in subband set 2 is first allocated. Therefore, cell 1 can minimize an effect of the interference from cell 2.

Referring to FIG. 8B, when it is determined that the checked load amount of cell 1 is less than or equal to 12% in 822, cell 1 checks the number of neighbor cells and a load amount of the neighbor cells in 824.

When the load amount is less than or equal to 12%, one subband should be allocated so that cell 1 determines that one of the "up" allocation method, the "dn" allocation method, and the "ct" allocation method is used as the subband allocation method based on the number of neighbor cells and the load amount of the neighbor cells.

Specifically, in step 824, cell 1 counts the number of cell 0 cells (Count_up), of which a load amount is greater than 36% and less than or equal to 60%, counts the number of cell 0 cells, of which a load amount is greater 48% and less than or equal to 60%, and the number of cell 2 cells, of which a load amount is greater than 40% and less than or equal to 52%, respectively and then adds the number of cell 1 cells to the number of cell 2 cells (Count_ct), and counts the number of cell 2 cells (Count_dn), of which a load amount is greater than 28% and less than or equal to 52%.

When subbands of cell 1 are allocated by using the "up" allocation method, the Count_up indicates the number of cell 0 cells allocating subbands 4 and 5 included in subband set 1. When subbands of cell 1 are allocated by using the "ct" allocation method, the Count_ct indicates the number of cell 0 and cell 2 cells allocating subband 5 included in subband set 1. In addition, when subbands of cell 1 are allocated by using the "dn" allocation method, the Count_dn indicates the number of cell 2 cells allocating subbands 5 and 6 included in subband set 1.

Meanwhile, a case where a load amount of cell 0 is greater than 60% and a load amount of cell 2 is greater than 52% indicates that a case where cell 0 and cell 2 allocate all of the subbands 4 to 6 included in subband set 1 so that the case is excluded from the count.

When the Count_up, the Count_ct, and the Count_dn are determined, cell 1 determines a minimum value from among the Count_up, the Count_ct, and the Count_dn values in step 826. When the Count_up is the minimum value, cell 1 proceeds to step 828 and allocates subbands by using the "up" allocation method. When the Count_ct is the minimum value, cell 1 proceeds to step 830 and allocates the subband by using the "ct" allocation method. When the Count_dn is the minimum value, cell 1 proceeds to step 832 and allocates the subband by using the "dn" allocation method.

In step 826, the number of minimum values may be two or more, or in other words, there are more than one from among the Count_up, the Count_ct, and the Count_dn values that is equal to the minimum value. In this case, cell 1 can arbitrarily select the subband allocation method. In FIG. 8B, a method of determining the subband allocation method according to a value of PCI mod 2 when there are two minimum values, and arbitrarily determining the subband allocation method according to a value of PCI mod 9 when there are three minimum values, is described.

When there are two from among the Count_up, the Count_ct, and the Count_dn values that have the minimum value, cell 1 calculates a PCI mod 2 value for its own PCI in step 834. When the value of PCI mod 2 is "0", cell 1 proceeds to step 836 and allocates the subband by using the "dn" allocation method. Alternatively, when the value of PCI mod 2 is "1", cell 1 proceeds to step 838 and allocates the subband by using the "up" allocation method.

Meanwhile, when there are three from among the Count_up, the Count_ct, and the Count_dn values having the minimum value, that is, the Count_up, the Count_ct, and the Count_dn all have the same value, cell 1 calculates a PCI mod 9 value for its own PCI in step 840. When the value of PCI mod 9 is "1", cell 1 proceeds to step 842 and allocates the subband by using the "up" allocation method. When the value of PCI mod 9 is "4", cell 1 proceeds to step 844 and allocates the subband by using the "ct" allocation method. When the value of PCI mod 9 is "7", cell 1 proceeds to step 846 and allocates the subband by using the "dn" allocation method.

Figure 9:
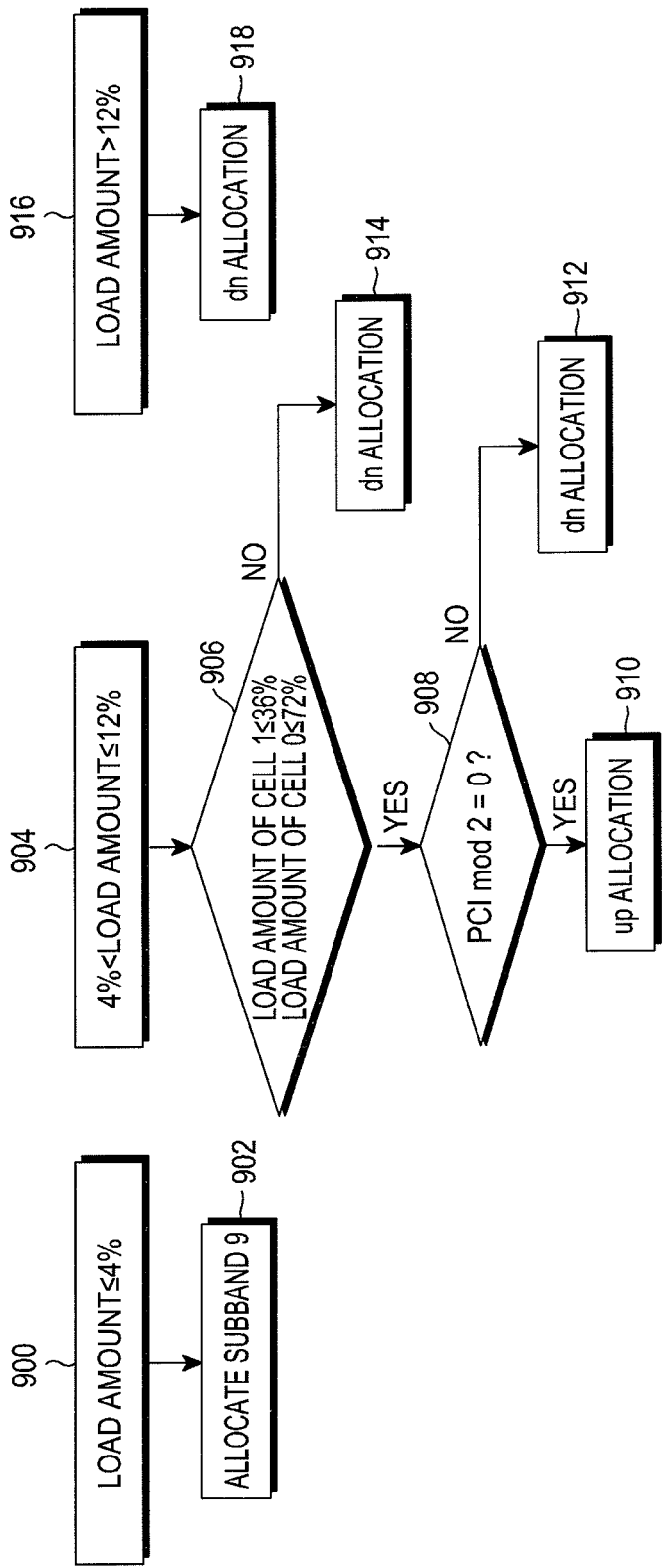
FIG. 9 is a flowchart illustrating a subband allocation process of a cell having a PCI mod 3 value of "2" in a wireless communication system according to an exemplary embodiment of the present invention.

FIG. 9 is a flowchart illustrating the subband allocation process of a cell having the PCI mod 3 value of "2" in a wireless communication system according to an exemplary embodiment of the present invention.

Referring to FIG. 9, cell 2 checks its own load amount and performs the following processes according to the checked load amount.

First, when it is determined that the checked load amount is less than or equal to 4% in step 900, cell 2 proceeds to step 902 and allocates subband 9. Since subband 9 is a subband having the farthest distance in frequency from subbands 1 to 6 included in subband sets 0 and 1 of neighbor cells 0 and 1, interference between cell 0 and cell 1 may be minimized.

Meanwhile, when it is determined, in step 916, that the checked load amount is greater than 12%, cell 2 proceeds to step 918 and allocates the subband by using the "dn" allocation method. At this time, it is determined whether subband 9 will be allocated according to the checked load amount. That is, when the checked load amount is greater than 12% and less than or equal to 16%, subbands 8 and 9 are allocated. When the checked load amount is greater than 16% and less than or equal to 24%, subbands 7 and 8 are allocated. Similarly, when the checked load amount is greater than or equal to 24%, it is determined whether subband 9 will be allocated according to the checked load amount.

In step 904, when it is determined that the checked load amount is greater than 4% and less than or equal to 12%, cell 2 allocates subband 7 or subband 8 by using one of the "up" allocation method and the "dn" allocation method. At this time, cell 2 does not allocate subband 9. However, in order to determine one of the "up" allocation method and the "dn" allocation method as the subband allocation method, cell 2 determines whether there is a cell 1 of which a load amount is greater than 36% or a cell 0 of which a load amount is greater than 72% in step 906.

When there is no cell 1 of which a load amount is less than or equal to 36% or there is no cell 0 of which a load amount is less than or equal to 72%, cell 2 determines that there is a neighbor cell allocating at least one of subbands included in subband set 2 and cell 2 proceed to step 914. In order to minimize interference from cell 0 and cell 1, cell 2 performs the subband allocation from subband 8 by using the "dn" allocation method in step 914.

Furthermore, when there is a cell 1 of which a load amount is less than or equal to 36% or cell 0 of which a load amount is less than or equal to 72%, in step 908, cell 2 calculates a PCI mod 2 for its own PCI in order to reduce the probability of causing interference between different cells having a PCI mod 2 value of "2", and allocates the subband by using one of the "up" allocation method and the "dn" allocation method according to the value of PCI mod 2.

That is, cell 2 calculates the PCI mod 2 for its own PCI in step 908 and determines whether the value of PCI mod 2 is "0". When the value of PCI mod 2 is "0", cell 2 allocates the subband by using the "up" allocation method in step 910. When the value of PCI mod 2 is "1", cell 2 allocates the subband by using the "dn" allocation method in step 912.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A subband scheduling method of an eNodeB in a wireless communication system, the method comprising:
    determining whether the eNodeB is in an overload state according to a used amount of a first radio resource of the eNodeB;
    if the eNodeB is not in the overload state, receiving information on a used amount of a second radio resource of at least one neighbor eNodeB from the at least one neighbor eNodeB;
    determining whether the at least one neighbor eNodeB is in the overload state according to the used amount of the second radio resource;
    if the at least one neighbor eNodeB is in the overload state, setting a number of total subbands to be used for a subband scheduling to a number lower than a number of total subbands used by the at least one neighbor eNodeB;
    setting a subband scheduling start order such that the subband scheduling is started from a subband having a farthest distance in frequency from at least one subband used by the at least one neighbor eNodeB from among the set number of subbands; and
    performing the subband scheduling according to the set number of subbands and the subband scheduling start order.

2. The method as claimed in claim 1, wherein the used amount of the first radio resource includes an average used amount of radio resources allocated to all terminals included in a cell of the eNodeB.

3. The method as claimed in claim 1, wherein the information on the used amount of the second radio resource includes Physical Resource Block (PRB) use information of the at least one neighbor eNodeB.

4. The method as claimed in claim 3, wherein the PRB use information includes PRB use information on a DownLink (DL) signal requiring a guarantee of Quality of Service (QoS), PRB use information on an UpLink (UL) signal requiring the guarantee of QoS, PRB use information on a DL signal not requiring the guarantee of QoS, PRB use information on a UL signal not requiring the guarantee of QoS, PRB use information on total DL signals, and PRB use information on total UL signals.

5. The method as claimed in claim 1, wherein determining of whether the eNodeB is in the overload state comprises:
    checking the used amount of the first radio resource in every iteration of a preset time period; and
    determining whether the eNodeB is in the overload state based on whether the used amount of the first radio resource is greater than a threshold.

6. The method as claimed in claim 1, wherein receiving of the information on the used amount of the second radio resource comprises:
    if the eNodeB is not in the overload state, requesting the at least one neighbor eNodeB to transmit the information on the used amount of the second radio resource; and
    receiving the information on the used amount of the second radio resource from the at least one neighbor eNodeB.

7. The method as claimed in claim 1, further comprising:
    if the eNodeB is in the overload state, setting the number of total subbands to be used for the subband scheduling to a number of total subbands maximally allocable by the eNodeB;
    setting a specific subband from among the total subbands as a start subband; and
    performing the subband scheduling by using the number of total subbands and the specific subband.

8. The method as claimed in claim 1, wherein setting of the subband scheduling start order comprises:
    comparing a first load amount, according to the used amount of the first radio resource, and a reference load amount, which is a load amount maximally processable by the eNodeB;
    if the first load amount is greater than the reference load amount, setting the subband scheduling start order so that the subband scheduling is started from the subband having the farthest distance in frequency from at least one subband used by the at least one neighbor eNodeB; and
    if the first load amount is equal to or less than the reference load amount, setting the subband scheduling start order so that the subband scheduling is started from a subband having no interference from the at least one neighbor eNodeB by using the at least one subband used by the at least one neighbor eNodeB and a second load amount according to the used amount of the second radio resource.

9. The method as claimed in claim 1, further comprising:
    if the eNodeB is not in the overload state, receiving the information on the used amount of the second radio resource and determining an identifier of the at least one neighbor eNodeB and a load amount of the at least one neighbor eNodeB based on the used amount of the second radio resource;
    determining whether interference from the at least one neighbor eNodeB exists based on the identifier of the at least one neighbor eNodeB and the load amount of the at least one neighbor eNodeB; and
    if the interference exists, performing the subband scheduling from a subband having no interference from the at least one neighbor eNodeB from among a plurality of available subbands for the subband scheduling.

10. The method as claimed in claim 1, further comprising:
    if the eNodeB is not in the overload state, receiving the information on the used amount of the second radio resource and determining an identifier of the at least one neighbor eNodeB and a load amount of the at least one neighbor eNodeB based on the used amount of the second radio resource;
    determining whether interference from the at least one neighbor eNodeB exists based on the identifier of the at least one neighbor eNodeB and the load amount of the at least one neighbor eNodeB; and if the interference does not exist, performing the subband scheduling from a certain subband from among a plurality of available subbands for the subband scheduling.

11. A subband scheduling apparatus of an eNodeB in a wireless communication system, the apparatus comprising:
a call processor for receiving information on a used amount of a second radio resource of at least one neighbor eNodeB from the at least one neighbor eNodeB;
a scheduler for storing information on a used amount of a first radio resource of the eNodeB and the used amount of the second radio resource, and for performing a subband scheduling;
a controller for determining whether the eNodeB is in an overload state according to the used amount of the first radio resource, for receiving, if the eNodeB is not in the overload state, the information on the used amount of the second radio resource from the at least one neighbor eNodeB by controlling the call processor, for determining whether the at least one neighbor eNodeB is in the overload state based on the used amount of the second radio resource, for setting, if the at least one neighbor eNodeB is in the overload state, a number of total subbands to be used for the subband scheduling to a number lower than a number of total subbands used by the at least one neighbor eNodeB, for setting a subband scheduling start order such that the subband scheduling is started from a subband having a farthest distance in frequency from at least one subband used by the at least one neighbor eNodeB from among the set number of subbands; and for controlling the scheduler to perform the subband scheduling according to the set number of subbands and the subband scheduling start order.

12. The apparatus as claimed in claim 11, wherein the used amount of the first radio resource includes an average used amount of radio resources allocated to all terminals included in a cell of the eNodeB.

13. The apparatus as claimed in claim 11, wherein the information on the used amount of the second radio resource includes Physical Resource Block (PRB) use information of the at least one neighbor eNodeB.

14. The apparatus as claimed in claim 13, wherein the PRB use information includes PRB use information on a DownLink (DL) signal requiring a guarantee of Quality of Service (QoS), PRB use information on an UpLink (UL) signal requiring the guarantee of QoS, PRB use information on a DL signal not requiring the guarantee of QoS, PRB use information on a UL signal not requiring the guarantee of QoS, PRB use information on total DL signals, and PRB use information on total UL signals.

15. The apparatus as claimed in claim 11, wherein the controller checks the used amount of the first radio resource in every iteration of a preset time period, and
wherein the controller determines whether the eNodeB is in the overload state based on whether the used amount of the first radio resource is greater than a threshold.

16. The apparatus as claimed in claim 11, wherein, if the eNodeB is not in the overload state, the controller controls the call processor such that the at least one neighbor eNodeB is requested to transmit the information on the used amount of the second radio resource, and receives the information on the used amount of the second radio resource from the at least one neighbor eNodeB.

17. The apparatus as claimed in claim 11, wherein, if the eNodeB is in the overload state, the controller sets the number of total subbands to be used for the subband scheduling to a number of total subbands maximally allocable by the eNodeB, sets a specific subband from among the total subbands as a start subband, and controls the scheduler such that the subband scheduling is performed according to the number of total subbands and the specific subband.

18. The apparatus as claimed in claim 11, wherein the controller compares a first load amount according to the used amount of the first radio resource and a reference load amount, the reference load amount being a load amount maximally processable by the eNodeB,
wherein the controller sets, if the first load amount is greater than the reference load amount, the subband scheduling start order so that the subband scheduling is started from the subband having the farthest distance in frequency from at least one subband used by the at least one neighbor eNodeB, and
wherein the controller sets, if the first load amount is equal to or lower than the reference load amount, the subband scheduling start order so that the subband scheduling is started from a subband having no interference from the at least one neighbor eNodeB by using the at least one subband used by the at least one neighbor eNodeB and a second load amount according to the used amount of the second radio resource.

19. The apparatus as claimed in claim 11, wherein, if the eNodeB is not in the overload state, the controller receives the information on the used amount of the second radio resource through the call processor, determines an identifier of the at least one neighbor eNodeB and a load amount of the at least one neighbor eNodeB based on the used amount of the second radio resource, determines whether interference from the at least one neighbor eNodeB exists based on the identifier of the at least one neighbor eNodeB and the load amount of the at least one neighbor eNodeB, and performs, if the interference exists, the subband scheduling from a subband having no interference from the at least one neighbor eNodeB from among a plurality of available subbands for the subband scheduling.

20. The apparatus as claimed in claim 19, wherein, if the eNodeB is not in the overload state, the controller receives the information on the used amount of the second radio resource through the call processor, determines an identifier of the at least one neighbor eNodeB and a load amount of the at least one neighbor eNodeB based on the used amount of the second radio resource, determines whether interference from the at least one neighbor eNodeB exists based on the identifier of the at least one neighbor eNodeB and the load amount of the at least one neighbor eNodeB, and performs, if the interference does not exist, the subband scheduling from a certain subband from among a plurality of available subbands for the subband scheduling.

* * * * *